(12) United States Patent
Sepitka

(10) Patent No.: US 6,604,589 B2
(45) Date of Patent: Aug. 12, 2003

(54) DRIVE FOR A VEHICLE INTENDED TO TRANSVERSE ROUGH TERRAIN

(75) Inventor: Jozef Sepitka, 2045 E. 16th St. 1st Floor, Brooklyn, NY (US) 11229

(73) Assignee: Jozef Sepitka, Brooklyn, NY (US)

( * ) Notice: Subject to any disclaimer, the term of this patent is extended or adjusted under 35 U.S.C. 154(b) by 22 days.

(21) Appl. No.: 09/999,036

(22) Filed: Nov. 24, 2001

(65) Prior Publication Data

US 2002/0112900 A1 Aug. 22, 2002

(51) Int. Cl.$^7$ .......................... B62D 57/00; B60B 19/00
(52) U.S. Cl. .................. 180/24.09; 301/5.1; 305/60
(58) Field of Search ................ 180/7.1, 24.09, 180/24.11, 24.12, 24.1; 301/5.1, 1; 305/60; 280/229

(56) References Cited

U.S. PATENT DOCUMENTS

| 2,786,540 | A | * | 3/1957 | Sfredda | 180/24.08 |
| 2,790,503 | A | * | 4/1957 | Kopczynski | 180/363 |
| 3,160,220 | A | * | 12/1964 | Goulden | 180/7.1 |
| 3,372,766 | A | * | 3/1968 | Lifferth | 180/7.1 |
| 3,388,760 | A | * | 6/1968 | Christie | 180/24.09 |
| 3,403,742 | A | * | 10/1968 | Stieg | 180/24.09 |
| 3,773,130 | A | * | 11/1973 | Mueller | 180/24.09 |
| 4,050,534 | A | * | 9/1977 | Nelson et al. | 180/24.09 |
| 4,102,423 | A | * | 7/1978 | Reid | 180/7.1 |
| 4,821,825 | A | * | 4/1989 | Somerton-Rayner | 180/22 |
| 5,860,889 | A | * | 1/1999 | Schlosser et al. | 475/221 |
| 5,881,831 | A | * | 3/1999 | Harvey | 180/6.2 |

FOREIGN PATENT DOCUMENTS

FR    2600944 A1  *  1/1988

* cited by examiner

Primary Examiner—Paul N. Dickson
Assistant Examiner—Ruth Ilan
(74) Attorney, Agent, or Firm—Jozef Sepitka

(57) ABSTRACT

A drive for a vehicle traversing rough terrain including first and second drive units and first and second pairs of tires. The first drive unit includes a first differential and axle. The second drive unit includes a second differential and axle. A secondary drive shaft synchronizes the second and first differentials. Each tire is divided into first and second segments. The center of the first segment is the rotational center of the tire so as to allow it to roll when in contact with the rough terrain. The first segment extends 240° and the second segment extends 120°. The radius of curvature of the second segment is greater than that of the first segment so as to allow it to be only slightly curved and almost flat, and as a result thereof, pointed areas are formed that bite into, and allow the second segment to grip, the rough terrain.

12 Claims, 4 Drawing Sheets

DRIVE FOR A VEHICLE INTENDED TO TRANSVERSE ROUGH TERRAIN

CROSS REFERENCE TO RELATED APPLICATIONS

BACKGROUND OF THE INVENTION

1. Field of the Invention

The present invention relates to a drive for a vehicle. More particularly, the present invention relates to a drive for a vehicle intended to traverse rough terrain

2. Description of the Prior Art

Numerous innovations for obstacle traversing drives have been provided in the prior art that will be described. Even though these innovations may be suitable for the specific individual purposes to which they address, however, they differ from the present invention.

FOR EXAMPLE, U.S. Pat. No. 4,674,757 to Martin teaches a wheel for use with a variety of devices for moving a load up or down a series of stairs. The wheel is comprised of a plurality of lobe-like teeth on a gear. Each lobe has two surfaces which are symmetrical around a lobe center line, with each surface being made up of a portion of an involute curve defined by a circle having a particular radius. The involute curves making up the surfaces of each lobe mirror each other on opposite sides of the center line and intersect to form the lobe at the largest radii of the portions of the involute curves making up the surfaces of the lobe. The wheel may be made to specifications allowing exact fit on a particular size stair step and a properly fitting wheel will move in a close approximation of a straight line parallel to the staircase incline as it moves up a flight of stairs.

ANOTHER EXAMPLE, U.S. Pat. No. 4,747,611 to Daugherty Jr. teaches selectively operable spiral cam wheels that are positioned adjacent and rotate on a common axis with the drive wheels and are attachable to the drive wheels for progressively raising the wheelchair in response to rotation of the drive wheels in one direction and for progressively lowering the wheelchair in response to rotation of the drive wheels in the opposite direction. The spiral cam wheels are also attachable to the wheelchair frame so that the drive wheels are free to be rotated in the normal manner. A lifting arm is pivotally supported at one end on each side of the frame of the wheelchair and the other end is moved by the spiral cam wheels to progressively lift the casters of the wheelchair as the wheelchair is moved toward a curb to be traversed. Embodiments of the wheelchair are disclosed in which the wheelchair is raised as it is moved in a forward direction toward the curb, and in which the wheelchair is raised as it is moved in a rearward direction toward the curb.

STILL ANOTHER EXAMPLE, U.S. Pat. No. 5,273,296 to Lepek teaches a suspension for propelling a vehicle so as to overcome an obstruction in its desired path of progress. The suspension includes connections between the chassis and body of the vehicle with its wheels or wheel like elements. A cam guides the rollers to overcome obstructions in the vehicle's path.

YET ANOTHER EXAMPLE, U.S. Pat. No. 5,881,831 to Harvey teaches a multi-terrain amphibious vehicle adapted for travel across surfaces of various type and attributes. The vehicle includes a chassis assembly which extends in a longitudinal direction; a plurality of propulsion members rotatably coupled to the chassis assembly for propelling the vehicle across a given surface; and, a control mechanism for controlling the rotational velocities and phases of the propulsion members. The propulsion members each rotate about axis that extends in a direction substantially normal to the longitudinal direction. Each propulsion member includes, for engaging the given surface, at least a first perimeter segment and a second perimeter segment coaxially disposed in angularly offset manner about its rotation axis. The first perimeter segment has an arcuate contour and extends radially farther from the rotation axis than does the second perimeter segment. In operation, the propulsion members are cooperatively rotated to collectively impart a predetermined speed and direction of travel to the vehicle.

It is apparent that numerous innovations for obstacle traversing drives have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a drive for a vehicle intended to traverse rough terrain that avoids the disadvantages of the prior art.

ANOTHER OBJECT of the present invention is to provide a drive for a vehicle intended to traverse rough terrain that is simple to use.

BRIEFLY STATED, STILL ANOTHER OBJECT of the present invention is to provide a drive for a vehicle traversing rough terrain including first and second drive units and first and second pairs of tires. The first drive unit includes a first differential and axle. The second drive unit includes a second differential and axle. A secondary drive shaft synchronizes the second and first differentials. Each tire is divided into first and second segments. The center of the first segment is the rotational center of the tire so as to allow it to roll when in contact with the rough terrain. The first segment extends 240° and the second segment extends 120°. The radius of curvature of the second segment is greater than that of the first segment so as to allow it to be only slightly curved and almost flat, and as a result thereof, pointed areas are formed that bite into, and allow the second segment to grip, the rough terrain.

The novel features which are considered characteristic of the present invention are set forth in the appended claims. The invention itself, however, both as to its construction and its method of operation, together with additional objects and advantages thereof, will be best from the following description of the specific embodiments when read and understood in connection with the accompanying drawing.

BRIEF DESCRIPTION OF THE DRAWING

The figures of the drawing are briefly described as follows.

Figure 1:
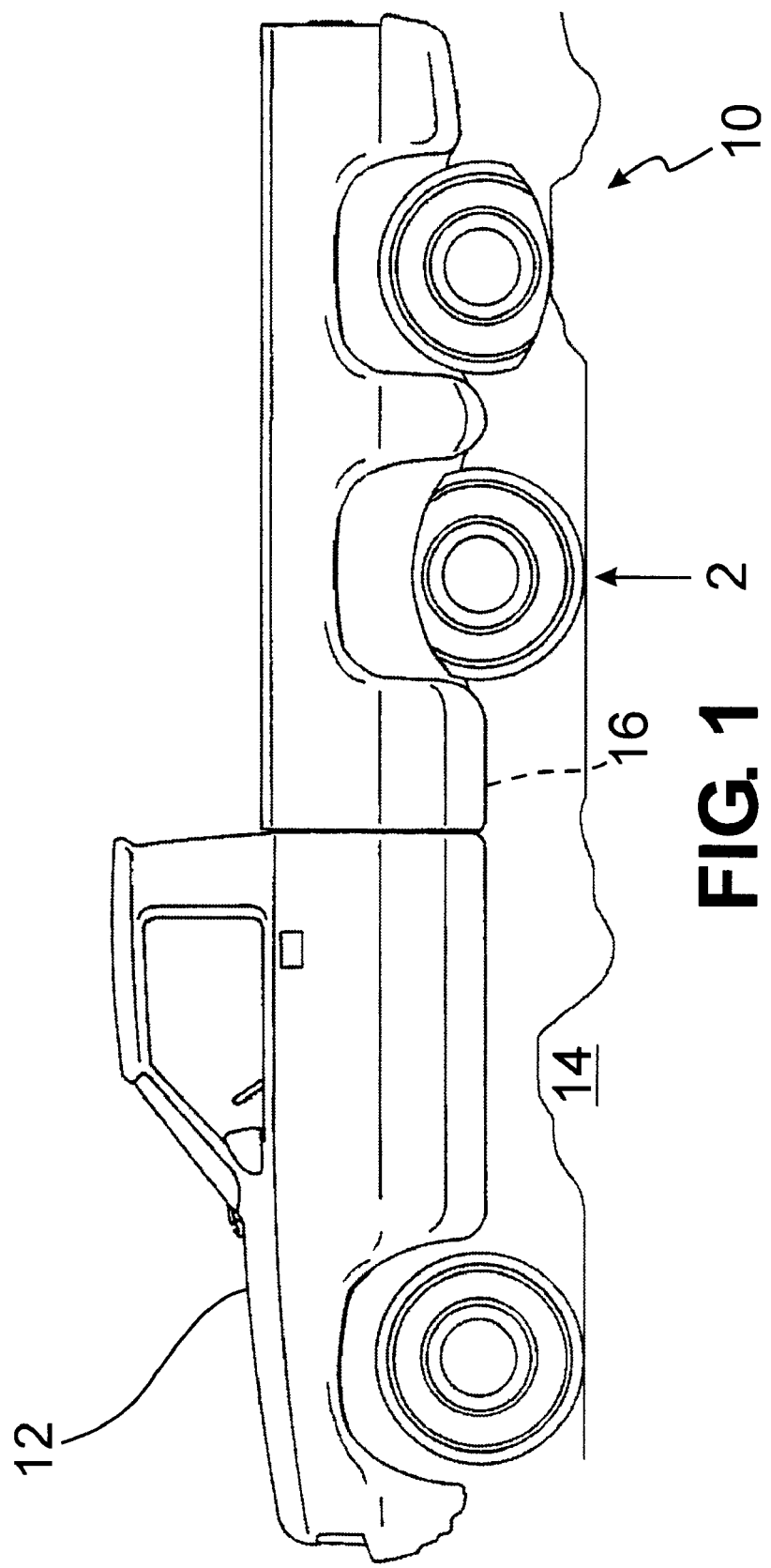
FIG. 1 is a diagrammatic perspective view of the drive of the present invention utilized on a vehicle intended to traverse rough terrain.

LIST OF REFERENCE NUMERALS UTILIZED IN THE DRAWING 10 drive of present invention for vehicle 12 intended to traverse rough terrain 14
12 vehicle intended to traverse rough terrain 14
14 rough terrain
16 drive shaft of vehicle 12
18 first drive unit for operatively connecting to drive shaft 16 of vehicle 12
20 second drive unit
22 first pair of tires for traversing rough terrain 14
24 second pair of tires for traversing rough terrain 14
26 first differential of first drive unit 18 for operatively connecting to drive shaft 16 of the vehicle 12
28 second differential of second drive unit 20
30 secondary drive shaft
32 first axle of first drive unit 18
34 second axle of second drive unit 20
36 rotational center of each tire of first pair of tires 22 and second pair of tires 24
38 periphery of each tire of first pair of tires 22 and second pair of tires 24
40 first segment of periphery 38 of each tire of first pair of tires 22 and second pair of tires 24
42 second segment of periphery 38 of each tire of first pair of tires 22 and second pair of tires 24
44 first arc of a circle of first segment 40 of periphery 38 of each tire of first pair of tires 22 and second pair of tires 24
46 first radius of curvature of first arc of a circle 44 of first segment 40 of periphery 38 of each tire of first pair of tires 22 and second pair of tires 24
48 first center of first arc of a circle 44 of first segment 40 of periphery 38 of each tire of first pair of tires 22 and second pair of tires 24
50 originating point of first arc of a circle 44 of first segment 40 of periphery 38 of each tire of first pair of tires 22 and second pair of tires 24
52 terminating point of first arc of a circle 44 of first segment 40 of periphery 38 of each tire of first pair of tires 22 and second pair of tires 24
54 second arc of a circle of second segment 42 of periphery 38 of each tire of first pair of tires 22 and second pair of tires 24
56 second radius of curvature of second arc of a circle 54 of second segment 42 of periphery 38 of each tire of first pair of tires 22 and second pair of tires 24
58 second center of second arc of a circle 54 of second segment 42 of periphery 38 of each tire of first pair of tires 22 and second pair of tires 24
60 pointed areas of periphery 38 of each tire of first pair of tires 22 and second pair of tires 24

DETAILED DESCRIPTION OF THE PREFERRED EMBODIMENT

Referring now to the figures, in which like numerals indicate like parts, and particularly to FIG. 1, which is a diagrammatic perspective view of the drive of the present invention utilized on a vehicle intended to traverse rough terrain, the drive of the present invention is shown generally at 10 for a vehicle 12 intended to traverse rough terrain 14 and having a drive shaft 16.

The overall configuration of the drive 10 can best be seen in FIG. 2, which is an enlarged diagrammatic bottom plan view taken generally in the direction of ARROW 2 in FIG. 1 of the present invention, and as such, will be discussed with reference thereto.

The drive 10 comprises a first drive unit 18 that operatively connected to the drive shaft 16 of the vehicle 12, a second drive unit 20 that is operatively connected to the first drive unit 18, a first pair of tires 22 that are operatively connected to the first drive unit 18 and are shaped to traverse the rough terrain 14, and a second pair of tires 24 that are operatively connected to the second drive unit 20 and are shaped to traverse the rough terrain 14.

The first drive unit 18 comprises a first differential 26 that is operatively connected to the drive shaft 16 of the vehicle 12 and the second drive unit 20 comprises a second differential 28 that is operatively connected to the first differential 26.

The drive 10 further comprises a secondary drive shaft 30 that operatively connects, and synchronizes, the second differential 28 to the first differential 26.

The first drive unit 18 further comprises a first axle 32 that is operatively connected to the first differential 26 thereof and has the first pair of tires 22 connected thereto, and the second drive unit 20 further comprises a second axle 34 that is operatively connected to the second differential 28 thereof and has the second pair of tires 24 connected thereto.

Figure 2:
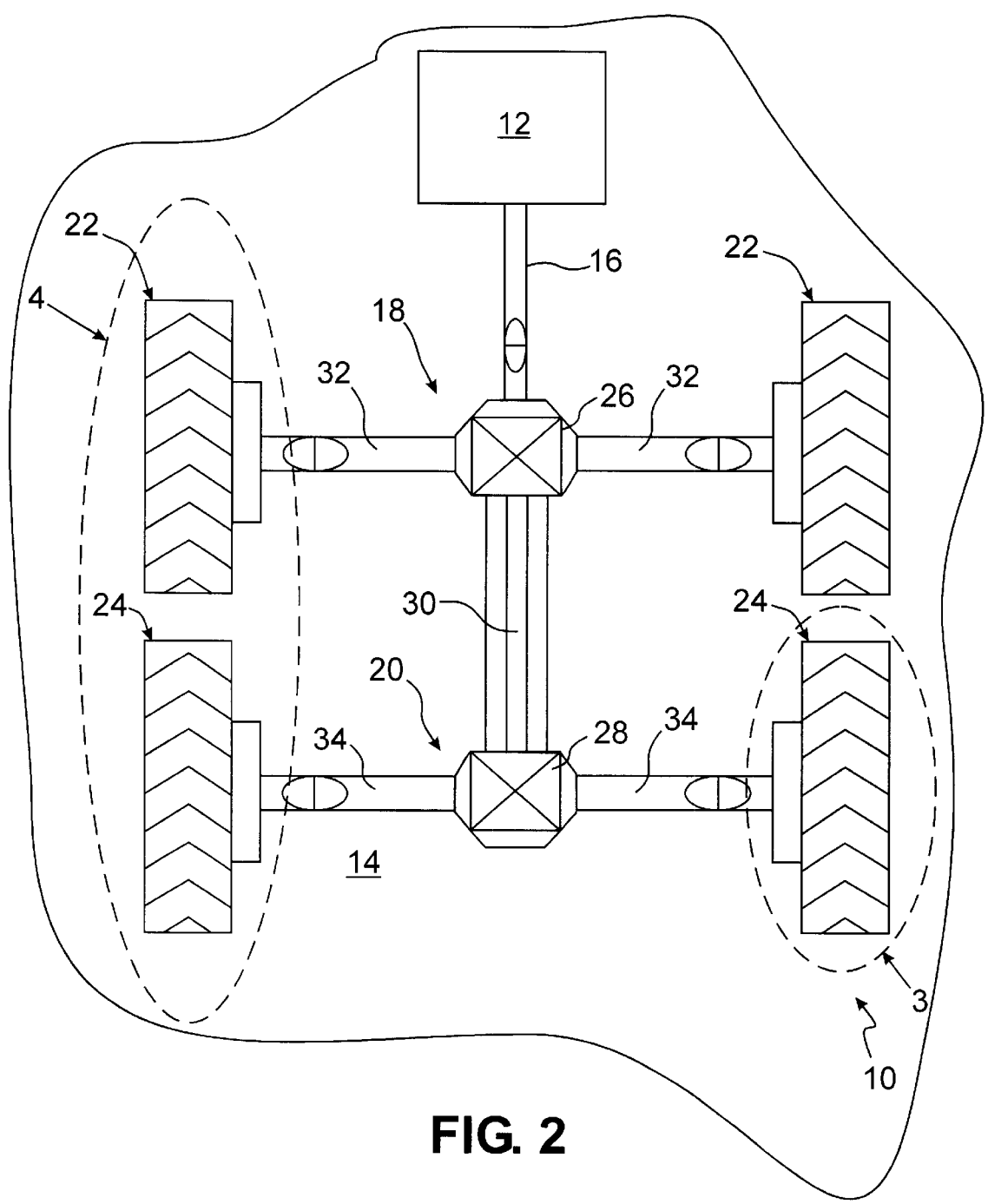
FIG. 2 is an enlarged diagrammatic bottom plan view taken generally in the direction of ARROW 2 in FIG. 1 of the present invention.
Figure 3:
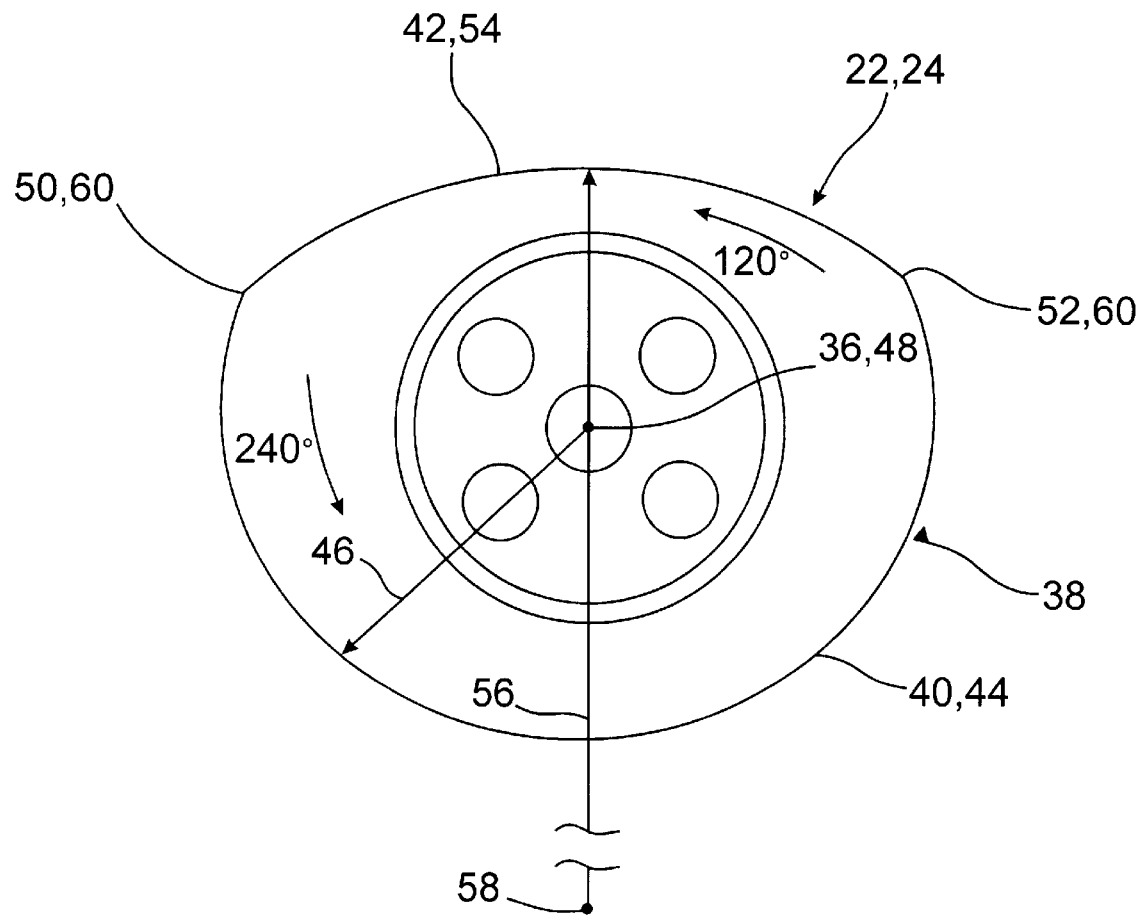
FIG. 3 is an enlarged diagrammatic side elevational view of the area generally enclosed by the dotted curve identified by ARROW 3 in FIG. 2 of a tire of the drive of the present invention shown in FIG. 2.
Figure 4:
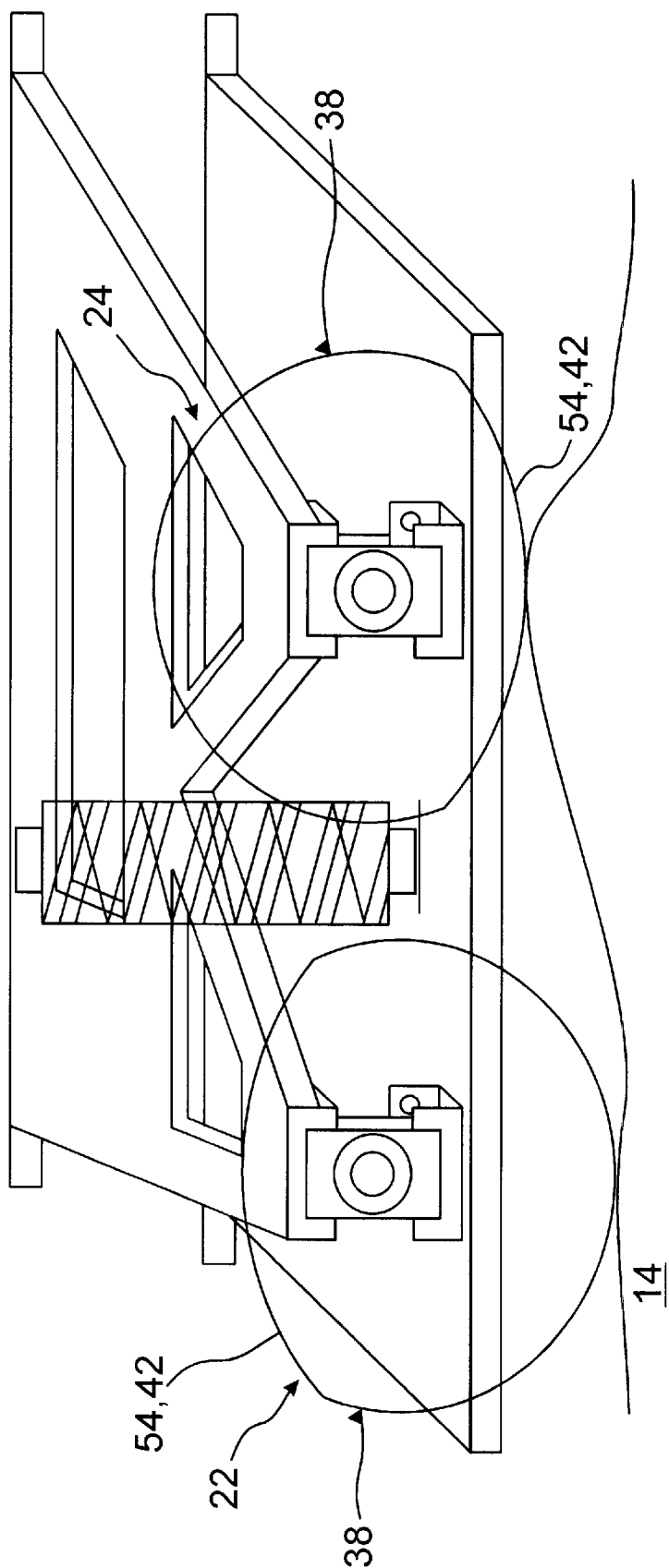
FIG. 4 is a diagrammatic side elevational view of the area generally enclosed by the dotted curve identified by ARROW 4 in FIG. 2 of a pair of tires on the same side of the drive of the present invention shown in FIG. 2.

The specific configuration of each tire of the first pair of tires 22 and the second pair of tires 24 can best be seen in FIGS. 3 and 4, which are, respectively, an enlarged diagrammatic side elevational view of the area generally enclosed by the dotted curve identified by ARROW 3 in FIG. 2 of a tire of the drive of the present invention shown in FIG. 2, and a diagrammatic side elevational view of the area generally enclosed by the dotted curve identified by ARROW 4 in FIG. 2 of a pair of tires on the same side of the drive of the present invention shown in FIG. 2, and as such, will be discussed with reference thereto.

As shown in FIG. 3, each tire of the first pair of tires 22 and the second pair of tires 24 are identical to each other and has a rotational center 36 and a periphery 38. The periphery 38 of each tire of the first pair of tires 22 and the second pair of tires 24 is divided into a first segment 40 and a second segment 42.

The first segment 40 of the periphery 38 of each tire of the first pair of tires 22 and the second pair of tires 24 is a first arc of a circle 44. The first arc of a circle 44 of the first segment 40 of the periphery 38 of each tire of the first pair of tires 22 and the second pair of tires 24 is smooth and has a first radius of curvature 46 and a first center 48 from which the first radius of curvature 46 thereof extends.

The first center 48 of the first arc of a circle 44 of the first segment 40 of the periphery 38 of each tire of the first pair of tires 22 and the second pair of tires 24 is the rotational center 36 of an associated tire of each tire of the first pair of tires 22 and the second pair of tires 24 so as to allow the first arc of a circle 44 of the first segment 40 of the periphery 38 of each tire of the first pair of tires 22 and the second pair of tires 24 to roll when in contact with the rough terrain 14.

The first arc of a circle 44 of the first segment 40 of the periphery 38 of each tire of the first pair of tires 22 and the second pair of tires 24 extends 240° from an originating point 50 thereof to a terminating point 52 thereof.

The second segment 42 of the periphery 38 of each tire of the first pair of tires 22 and the second pair of tires 24 is a second arc of a circle 54. The second arc of a circle 54 of the second segment 42 of the periphery 38 of each tire of the first pair of tires 22 and the second pair of tires 24 is smooth and has a second radius of curvature 56 and a second center 58 from which the second radius of curvature 56 thereof extends.

The second arc of a circle 54 of the second segment 42 of the periphery 38 of each tire of the first pair of tires 22 and the second pair of tires 24 extends 120° from the originating point 50 of the first arc of a circle 54 of the first segment 42 of an associated tire of each tire of the first pair of tires 22 and the second pair of tires 24 to the terminating point 52 of the first arc of a circle 54 of the first segment 42 of the associated tire of each tire of the first pair of tires 22 and the second pair of tires 24 so as to close the first arc of a circle 44 of the first segment 40 of the associated tire of each tire of the first pair of tires 22 and the second pair of tires 24.

The second radius of curvature 56 of the second arc of a circle 54 of the second segment 42 of the periphery 38 of each tire of the first pair of tires 22 and the second pair of tires 24 is greater than the first radius of curvature 46 of the first arc of a circle 44 of the first segment 40 of the periphery 38 of an associated tire of the first pair of tires 22 and the second pair of tires 24 so as to allow the second arc of a circle 54 of the second segment 42 of the periphery 38 of the associated tire of the first pair of tires 22 and the second pair of tires 24 to be only slightly curved and almost flat, and as a result thereof, pointed areas 60 are formed at the originating point 50 of the first arc of a circle 44 of the first second segment 40 of the periphery 38 of the associated tire of the first pair of tires 22 and the second pair of tires 24 and the terminating point 52 of the first arc of a circle 44 of the first second segment 40 of the periphery 38 of the associated tire of the first pair of tires 22 and the second pair of tires 24 that bite into, and allow the second arc of a circle 54 of the second segment 42 of the periphery 38 of the associated tire of the first pair of tires 22 and the second pair of tires 24 to grip, the rough terrain 14.

The second center 58 of the second arc of a circle 54 of the second segment 42 of the periphery 38 of each tire of the first pair of tires 22 and the second pair of tires 24 is not the rotational center 38 of an associated tire of each tire of the first pair of tires 22 and the second pair of tires 24.

As shown in FIG. 4, the second arc of a circle 54 of the second segment 42 of the periphery 38 of one tire of the first pair of tires 22 is offset 180° from the second arc of a circle 54 of the second segment 42 of the periphery 38 of one tire of the second pair of tires 24 that is in tandem therewith so as to allow the first arc of a circle 44 of the first segment 40 of the periphery 38 of one of the one tire of the first pair of tires 22 and the one tire of the second pair of tires 24 to always be in contact with the rough terrain 14.

It will be understood that each of the elements described above, or two or more together, may also find a useful application in other types of constructions differing from the types described above.

While the invention has been illustrated and described as embodied in a drive for a vehicle intended to traverse rough terrain, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A drive for a vehicle intended to traverse rough terrain, wherein the vehicle has a drive shaft, said drive comprising:
    a) a first drive unit;
    b) a second drive unit;
    c) a first pair of tires;
    d) a second pair of tires; and
    e) a secondary drive shaft;
        wherein said first drive unit is for operatively connecting to the drive shaft of the vehicle;
        wherein said second drive unit is operatively connected to said first drive unit;
        wherein said first pair of tires are operatively connected to said first drive unit;
        wherein said first pair of tires are shaped for traversing the rough terrain;
        wherein said second pair of tires are operatively connected to said second drive unit;
        wherein said second pair of tires are shaped for traverse the rough terrain;
        wherein each tire of said first pair of tires and said second pair of tires are identical to each other;
        wherein each tire of said first pair of tires and said second pair of tires has a rotational center;
        wherein each tire of said first pair of tires and said second pair of tires has a periphery;
        wherein said periphery of each tire of said first pair of tires and said second pair of tires is divided into a first segment and a second segment;
        wherein said first segment of said periphery of each tire of said first pair of tires and said second pair of tires is a first arc of a circle;
        wherein said first arc of a circle of said first segment of said periphery of each tire of said first pair of tires and said second pair of tires has a first radius of curvature;
        wherein said first arc of a circle of said first segment of said periphery of each tire of said first pair of tires and said second pair of tires has a first center;
        wherein said first radius of curvature extends from said first center of said first arc of a circle of said first segment of said periphery of each tire of said first pair of tires and said second pair of tires;
        wherein said first center of said first arc of a circle of said first segment of said periphery of each tire of said first pair of tires and said second pair of tires is said rotational center of an associated tire of each tire of said first pair of tires and said second pair of tires so as to allow said first arc of a circle of said first segment of said periphery of each tire of said first pair of tires and said second pair of tires to roll when in contact with the rough terrain;
        wherein said first arc of a circle of said first segment of said periphery of each tire of said first pair of tires and said second pair of tires extends 240° from an originating point thereof to a terminating point thereof;
        wherein said second segment of said periphery of each tire of said first pair of tires and said second pair of tires is a second arc of a circle;
        wherein said second arc of a circle of said second segment of said periphery of each tire of said first pair of tires and said second pair of tires extends 120° from said originating point of said first arc of a circle of said first segment of an associated tire of each tire of said first pair of tires and said second pair of tires to said terminating point of said first arc of a circle of said first segment of said associated tire of each tire of said first pair of tires and said second pair of tires so as to close said first arc of a circle of said first segment of said associated tire of each tire of said first pair of tires and said second pair of tires;

wherein said second arc of a circle of said second segment of said periphery of each tire of said first pair of tires and said second pair of tires has a second center; and wherein said second center of said second arc of a circle of said second segment of said periphery of each tire of said first pair of tires and said second pair of tires is not said rotational center of an associated tire of each tire of said first pair of tires and said second pair of tires.

2. The drive as defined in claim 1, wherein said first drive unit comprises a first differential; and wherein said first differential is for operatively connecting to the drive shaft of the vehicle.

3. The drive as defined in claim 2, wherein said second drive unit comprises a second differential; and wherein said second differential is operatively connected to said first differential.

4. The drive as defined in claim 3, further comprising a secondary drive shaft;

wherein said secondary drive shaft operatively connects said second differential to said first differential; and wherein said secondary drive shaft synchronizes said second differential to said first differential.

5. The drive as defined in claim 1, wherein said first drive unit comprises a first axle; and wherein said first axle is operatively connected to said first differential.

6. The drive as defined in claim 5, wherein said first pair of tires are connected to said first axle.

7. The drive as defined in claim 1, wherein said second drive unit comprises a second axle; and wherein said second axle is operatively connected to said second differential.

8. The drive as defined in claim 7, wherein said second pair of tires are connected to said second axle.

9. The drive as defined in claim 1, wherein said first arc of a circle of said first segment of said periphery of each tire of said first pair of tires and said second pair of tires is smooth.

10. The drive as defined in claim 1, wherein said second arc of a circle of said second segment of said periphery of each tire of said first pair of tires and said second pair of tires is smooth.

11. The drive as defined in claim 1, wherein said second arc of a circle of said second segment of said periphery of each tire of said first pair of tires and said second pair of tires has a second radius of curvature; and wherein said second radius of curvature of said second arc of a circle of said second segment of said periphery of each tire of said first pair of tires and said second pair of tires is greater than said first radius of curvature of said first arc of a circle of said first segment of said periphery of an associated tire of said first pair of tires and said second pair of tires so as to allow said second arc of a circle of said second segment of said periphery of said each tire of said first pair of tires and said second pair of tires to be only slightly curved and almost flat, and as a result thereof, pointed areas are formed at said originating point of said first arc of a circle of said first second segment of said periphery of each tire of said first pair of tires and said second pair of tires and said terminating point of said first arc of a circle of said first segment of said periphery of an associated tire of said first pair of tires and said second pair of tires that bite into, and allow said second arc of a circle of said second segment of said periphery of each tire of said first pair of tires and said second pair of tires to grip, the rough terrain.

12. The drive as defined in claim 1, wherein said second arc of a circle of said second segment of said periphery of one tire of said first pair of tires is offset 180° from said second arc of a circle of said second segment of said periphery of one tire of said second pair of tires that is in tandem therewith so as to allow said first arc of a circle of said first segment of said periphery of one of said one tire of said first pair of tires and said one tire of said second pair of tires to always be in contact with the rough terrain.

* * * * *